US008886036B2

United States Patent
Jeong et al.

(10) Patent No.: US 8,886,036 B2
(45) Date of Patent: Nov. 11, 2014

(54) OPTICAL LINE TERMINAL FOR MONITORING AND CONTROLLING UPSTREAM/DOWNSTREAM OPTICAL SIGNALS

(71) Applicant: Electronics and Telecommunications Research Institute, Daejeon (KR)

(72) Inventors: Jong Sool Jeong, Daejeon (KR); Hyun Soo Kim, Daejeon (KR); Mi-Ran Park, Daejeon (KR); Byungseok Choi, Daejeon (KR); O-Kyun Kwon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 75 days.

(21) Appl. No.: 13/848,222

(22) Filed: Mar. 21, 2013

(65) Prior Publication Data
US 2014/0161445 A1      Jun. 12, 2014

(30) Foreign Application Priority Data

Dec. 12, 2012   (KR) .......................... 10-2012-0144281

(51) Int. Cl.
*H04B 10/08*    (2006.01)
*H04B 10/07*    (2013.01)

(52) U.S. Cl.
CPC ...................................... *H04B 10/07* (2013.01)
USPC ................... 398/34; 398/33; 398/30; 398/79; 398/95

(58) Field of Classification Search
CPC ...... H04B 10/572; H04B 10/50; H04B 10/07; H04B 10/0773; H04B 10/503; H04B 10/564; H04B 2210/075; H04B 10/075; H04J 14/02; H04J 14/0221; H04J 14/0276; G02B 6/12004; G02B 6/12019

USPC .................... 398/66–72, 79, 91, 95
See application file for complete search history.

(56) References Cited

U.S. PATENT DOCUMENTS 4,989,201 A * 1/1991 Glance ............................ 398/95
5,920,414 A * 7/1999 Miyachi et al. ................. 398/14
(Continued)

FOREIGN PATENT DOCUMENTS

KR    10-2004-0023305 A    3/2004
KR    10-2004-0024733 A    3/2004

OTHER PUBLICATIONS

Runxiang Yu et al., "High-Precision In-situ Wavelength Stabilization and Monitoring of Tunable Lasers Using AWG and PD Arrays", Optical Fiber Communication Conference and Exposition (OFC/NFOEC), 2011 and the National Fiber Optic Engineers Conference, Mar. 6-10, 2011, pp. 1-3.

(Continued)

*Primary Examiner* — Daniel Washburn
*Assistant Examiner* — Hibret Woldekidan
(74) *Attorney, Agent, or Firm* — Rabin & Berdo, P.C.

(57) ABSTRACT

Disclosed is an optical line terminal for monitoring and controlling upstream and downstream optical signals, and more particularly, to an optical line terminal for monitoring and controlling upstream and downstream optical signals, which adds different low frequency monitoring signals to upstream and downstream wavelength division multiplexing optical signals in a bidirectional wavelength division multiplexing (WDM) optical network and senses and detects low frequency components of upstream and downstream optical signals to unite, monitor, and control optical outputs and wavelengths of the upstream and downstream wavelength division multiplexing optical signals into a single system.

8 Claims, 4 Drawing Sheets

(56) References Cited

U.S. PATENT DOCUMENTS

| | | | |
|---|---|---|---|
| 6,144,485 A * | 11/2000 | Sugaya et al. | 359/337 |
| 6,583,901 B1 * | 6/2003 | Hung | 398/79 |
| 7,301,612 B2 * | 11/2007 | Weaver | 356/73.1 |
| 7,526,200 B2 * | 4/2009 | Nakano et al. | 398/34 |
| 7,680,364 B2 * | 3/2010 | Nilsson et al. | 385/14 |
| 8,155,488 B2 * | 4/2012 | Nilsson et al. | 385/14 |
| 8,514,381 B2 * | 8/2013 | Shao et al. | 356/73.1 |
| 2005/0046927 A1 * | 3/2005 | Sugaya et al. | 359/337 |
| 2011/0205620 A1 * | 8/2011 | Sugaya et al. | 359/337.1 |
| 2013/0209094 A1 * | 8/2013 | Jeong et al. | 398/34 |

OTHER PUBLICATIONS

H. Nasu et al., "Ultrahigh Wavelength Stability Through Thermal Compensation in Wavelength-Monitor Integrated Laser Modules", IEEE Photonics Technology Letters, Mar. 2003, pp. 380-382, vol. 15, No. 3.

* cited by examiner

OPTICAL LINE TERMINAL FOR MONITORING AND CONTROLLING UPSTREAM/DOWNSTREAM OPTICAL SIGNALS

CROSS-REFERENCE TO RELATED APPLICATIONS

This application is based on and claims priority from Korean Patent Application No. 10-2012-0144281, filed on Dec. 12, 2012, with the Korean Intellectual Property Office, the disclosure of which is incorporated herein in its entirety by reference.

TECHNICAL FIELD

The present disclosure relates to an optical line terminal for monitoring and controlling upstream and downstream optical signals, and more particularly, to an optical line terminal for monitoring and controlling upstream and downstream optical signals, which adds different low frequency monitoring signals to upstream and downstream wavelength division multiplexing optical signals in a bidirectional wavelength division multiplexing (WDM) optical network and senses and detects low frequency components of upstream and downstream optical signals to unite, monitor, and control optical outputs and wavelengths of the upstream and downstream wavelength division multiplexing optical signals into a single system.

BACKGROUND

A wavelength division multiplexing (WDM) scheme is a scheme of transmitting a plurality of optical signals having different wavelengths through a single optical fiber. A wavelength division multiplexing optical network is configured to include a central office (CO), optical network units (ONUs), and an optical distribution network that connects the central office (CO) with the optical network units (ONUs). As the most economic structure of several optical distribution networks, a star structure in which remote nodes (RNs) including wavelength multiplexer and demultiplexer are installed at adjacent areas of optical subscribers, the CO and the RNs are connected with each other through a single optical fiber, and the remote nodes and the optical subscribers are connected with each other through an optical fiber has been used.

The wavelength division multiplexing optical network structure that has been the most well-known up to now is a structure of dividing wavelength bands of upstream and downstream signals and using different wavelength bands. The wavelength division multiplexing network structure of the wavelength-band division type is most representative, in which single cyclic type wavelength multiplexer and demultiplexer are disposed at the central office and the remote nodes, respectively, the wavelength multiplexer and demultiplexer of the central office and the wavelength multiplexer and demultiplexer of the remote node are connected with each other through a single optical fiber, and each port of the wavelength multiplexer and demultiplexer and the optical network unit are connected with each other by a start structure. An optical transceiver used herein is configured of a wavelength-band dividing optical filter, an optical transmitter, and an optical receiver. As the wavelength-division band is narrow, it is difficult to technically implement the wavelength-band dividing optical filter. Therefore, when the upstream wavelength division multiplexing optical signal is used as a C-band wavelength band and the downstream wavelength division multiplexing optical signal is used as an L-band wavelength band, a method for dividing an optical module that wavelength-multiplexes the downstream wavelength division multiplexing optical signal and an optical module that wavelength-demultiplexes the upstream wavelength division multiplexing optical signal has been mainly used for the central office.

In the system apparatus of the wavelength division multiplexing optical network that has adopted a method for dividing the wavelength multiplexer and the wavelength demultiplexer according to the related art as described above, a method for controlling and monitoring the optical outputs and wavelengths of the optical transmitter of the optical network unit and the optical transmitter of the optical line terminal has been proposed. In the representative controlling and monitoring method, an output unit of the optical line terminal uses an optical power dividing tap coupler, an upstream signal controlling and monitoring wavelength demultiplexer, a downstream signal controlling and monitoring wavelength demultiplexer, a monitoring photodetector. The controlling and monitoring method needs to add two wavelength demultiplexers to the system apparatus of the wavelength division multiplexing optical network, and therefore the size and the construction cost of the system are increased.

In order to overcome the shortcomings, a method for installing a reflective tap coupler at the output unit of the wavelength multiplexer and installing a controlling and monitoring photodetector in front of the optical transmitter is used. However, a method for installing the controlling and monitoring photodetector in front of the optical transmitter requires a multi-wavelength reference signal generator and an expensive locking-Amp, and therefore the system construction has been complicated and the cost has increased.

SUMMARY

The present disclosure has been made in an effort to provide an optical line terminal for monitoring and controlling upstream and downstream optical signals, which adds different low frequency monitoring signals to upstream and downstream wavelength division multiplexing optical signals in a bidirectional wavelength division multiplexing (WDM) optical network and senses and detects low frequency components of upstream and downstream optical signals to unite, monitor, and control optical outputs and wavelengths of the upstream and downstream wavelength division multiplexing optical signals into a single system.

An exemplary embodiment of the present disclosure provides an optical line terminal for monitoring and controlling upstream and downstream optical signals, including: an optical transmitting unit configured to generate and wavelength-multiplex a downstream wavelength division multiplexing optical signal coupled with a second low frequency monitoring signal for monitoring a downstream optical signal; a wavelength-band dividing and coupling unit configured to transmit the wavelength-multiplexed downstream wavelength division multiplexing optical signal through an optical line and transmit an upstream wavelength division multiplexing optical signal received from an optical network unit; an optical receiving unit configured to wavelength-demultiplex and receive the upstream wavelength division multiplexing optical signal transmitted from the wavelength-band dividing and coupling unit; a monitoring tap coupler configured to branch a part of optical power of the upstream and downstream wavelength division multiplexing optical signals; a monitoring signal processing unit configured to transmit the branched upstream and downstream wavelength division multiplexing optical signals to photodetectors connected with each channel by monitoring circular wavelength demultiplexing so as to be converted into electrical monitoring signals and pass the converted monitoring signals through first and second low frequency band filters to detect first and second low frequency monitoring signals; a signal processing module configured to control the downstream wavelength division multiplexing optical signal based on the detected second low frequency signal and generate optical network unit control information from the extracted first low frequency monitoring signal; and a switch configured to transmit the extracted optical network unit control information to the optical transmitting unit through the signal processing module so as to control the optical network unit.

Another exemplary embodiment of the present disclosure provides an optical line terminal for monitoring and controlling upstream and downstream optical signals, including: an optical transmitting unit configured to generate and wavelength-multiplex a downstream wavelength division multiplexing optical signal coupled with a second low frequency monitoring signal for monitoring a downstream optical signal; a wavelength-band dividing and coupling unit configured to transmit the wavelength-multiplexed downstream wavelength division multiplexing optical signal through an optical line and transmit an upstream wavelength division multiplexing optical signal received from an optical network unit; an optical receiving unit configured to wavelength-demultiplex and receive the upstream wavelength division multiplexing optical signal transmitted from the wavelength-band dividing and coupling unit; a monitoring tap coupler configured to branch a part of optical power of the upstream and downstream wavelength division multiplexing optical signals; a monitoring signal processing unit configured to transmit the branched upstream and downstream wavelength division multiplexing optical signals to photodetectors connected with different channels by monitoring extended wavelength demultiplexing to be converted into electrical first and second low frequency monitoring signals; a signal processing module configured to control the downstream wavelength division multiplexing optical signal based on the converted second low frequency signal and generate optical network unit control information from the extracted first low frequency monitoring signal; and a switch configured to transmit the extracted optical network unit control information to the optical transmitting unit through the signal processing module so as to control the optical network unit.

Yet another exemplary embodiment of the present disclosure provides an optical line terminal for monitoring and controlling upstream and downstream optical signals, including: an optical transmitting unit configured to generate and wavelength-multiplex a downstream wavelength division multiplexing optical signal coupled with a second low frequency monitoring signal for monitoring a downstream optical signal; a wavelength-band dividing and coupling unit configured to transmit the wavelength-multiplexed downstream wavelength division multiplexing optical signal through an optical line and transmit an upstream wavelength division multiplexing optical signal received from an optical network unit; a monitoring branch tap coupler configured to branch a part of optical power of the downstream wavelength division multiplexing optical signal; a monitoring coupling tap coupler configured to couple the branched downstream wavelength division multiplexing optical signal and the transmitted upstream wavelength division multiplexing optical signal; an optical receiving unit configured to perform demultiplexing on the upstream and downstream wavelength division multiplexing optical signals at different channels to transmit the upstream and downstream wavelength division multiplexing optical signals differently, convert the transmitted upstream wavelength division multiplexing optical signal into an electrical first low frequency monitoring signal, and convert the transmitted downstream wavelength division multiplexing optical signal into an electrical second low frequency monitoring signal; a signal processing module configured to control the downstream wavelength division multiplexing optical signal based on the converted second low frequency signal and generate optical network unit control information from the extracted first low frequency monitoring signal; and a switch configured to transmit the extracted optical network unit control information to the optical transmitting unit through the signal processing module so as to control the optical network unit.

According to the exemplary embodiments of the present disclosure, it is possible to unite, monitor, and control the optical outputs and wavelengths of the upstream and downstream wavelength division multiplexing optical signals into the single system, by adding different low frequency monitoring signals to the upstream and downstream wavelength division multiplexing optical signals in the bidirectional wavelength division multiplexing optical network and allowing the optical signal controlling and monitoring apparatus located in the optical line terminal to sense and detect the low frequency components of the upstream and downstream optical signals.

According to the exemplary embodiments of the present disclosure, it is possible to realize the simplification, miniaturization, low price, and the like, of the controlling and monitoring apparatus, by providing the efficient controlling and monitoring system for the optical outputs and wavelengths of the upstream and downstream WDM optical signals.

According to the exemplary embodiments of the present disclosure, it is possible to provide a base technology capable of implementing the high-quality apparatus for controlling and monitoring optical signals, by minimizing the mutual interference between the upstream and downstream signals in controlling and monitoring the optical signal.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
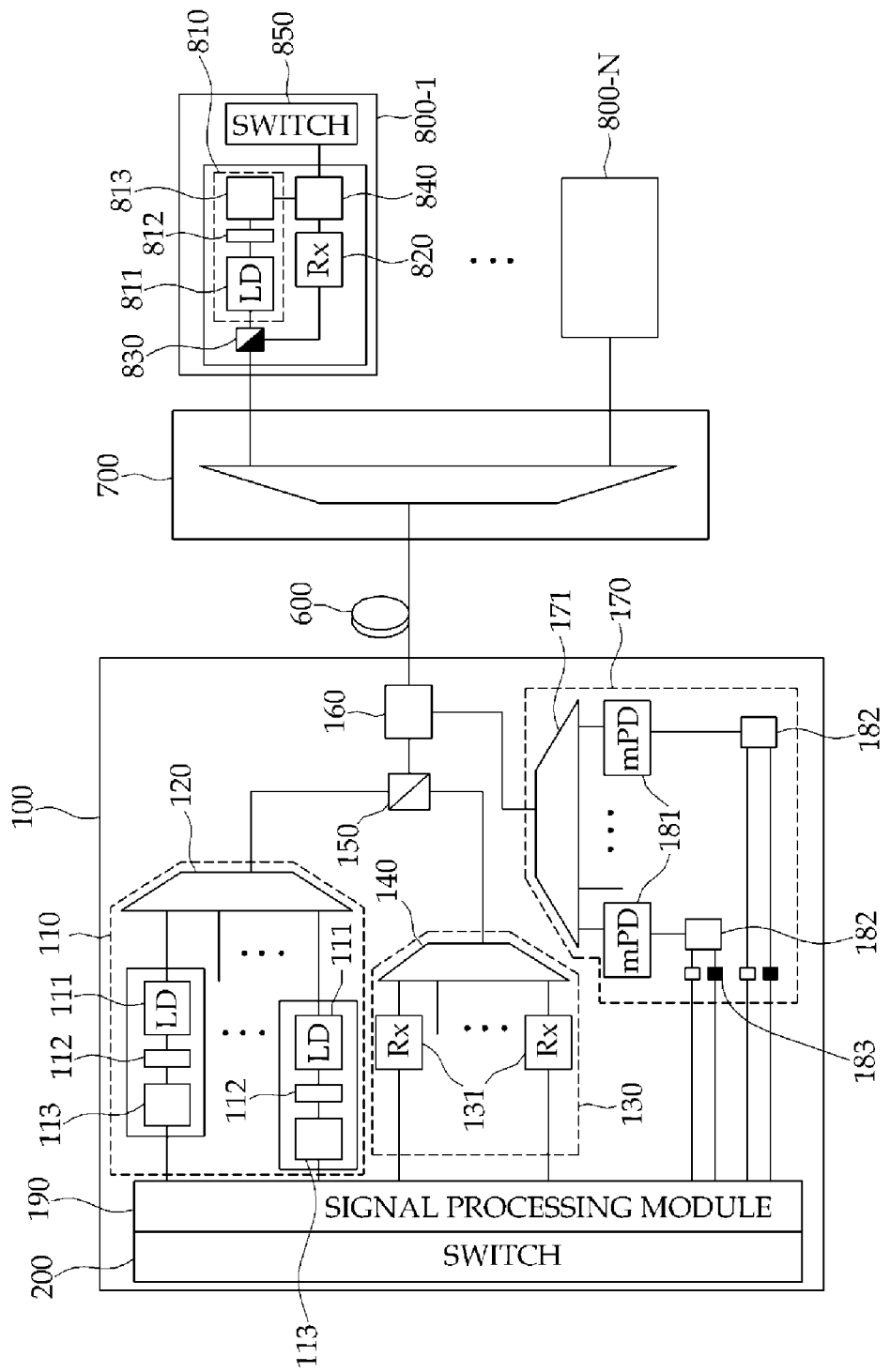
FIG. 1 is a configuration diagram of a system for monitoring and controlling upstream and downstream optical signals in a bidirectional wavelength division multiplexing optical network according to a first exemplary embodiment of the present disclosure.

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

Hereinafter, exemplary embodiments of the present disclosure will be described in detail with reference to the accompanying drawings. Hereinafter, a configuration and an acting effect of exemplary embodiments of the present disclosure will be clearly understood through the following detailed description. Prior to the detailed description of exemplary embodiments of the present disclosure, it is to be noted that like reference numerals refer to like elements even though like elements are shown in different drawings and well-known functions or constructions will not be described in detail since they may unnecessarily obscure the understanding of the present disclosure.

FIG. 1 is a configuration diagram of a system for monitoring and controlling upstream and downstream optical signals in a bidirectional wavelength division multiplexing optical network according to a first exemplary embodiment of the present disclosure.

As illustrated in FIG. 1, a system for monitoring and controlling upstream and downstream wavelength division multiplexing optical signals includes an optical line terminal (OLT) 100 and optical network units (ONU) 800-1, . . . , 800-N (hereinafter, referred to as 800). In this configuration, the optical line terminal 100 and the optical network unit 800 are connected with each other through an optical line 600 and a remote node 700. The optical network unit 800 includes an optical transmitter 810, an optical receiver 820, a wavelength-band divider and coupler 830, a signal processing module 840, and a switch 850. Meanwhile, the optical line terminal 100 includes an optical transmitting unit 110, an optical receiving unit 130, a wavelength-band dividing and coupling unit 150, a monitoring tap coupler 160, a monitoring signal processing unit 170, a signal processing module 190, and a switch 200. The optical transmitting unit 110 includes a laser diode (LD) 111, a low frequency generator 112, a laser diode driver 113, and a standard wavelength multiplexer 120. The optical receiving unit 130 includes an optical receiver 131 and a standard wavelength demultiplexer 140. The monitoring signal processing unit 170 includes a monitoring cyclic type wavelength demultiplexer 171, a monitoring photodetector (mPD) 181, an electrical signal distributor 182, and a low frequency electrical filter 183. A system for monitoring and controlling upstream and downstream wavelength division multiplexing optical signals may unite an apparatus for controlling and monitoring upstream and downstream optical signals into the monitoring signal processing unit 170, the signal processing module 190, and the switch 200 of a single system, thereby leading to simplification, miniaturization, low price, and the like, of the system for monitoring and controlling upstream and downstream optical signals.

Hereinafter, each component of the system for monitoring and controlling upstream and downstream wavelength division multiplexing optical signals will be described.

Meanwhile, the optical network unit 800 generates and transmits the upstream wavelength division multiplexing optical signal coupled with a first low frequency monitoring signal for monitoring the upstream optical signal.

Describing components of the optical network unit 800, the optical transmitter 810 generates and transmits a data signal and the upstream wavelength division multiplexing optical signal coupled with the first low frequency monitoring signal. For example, the optical transmitter 810 may add a low frequency monitoring signal of about 1 kHz to the data signal.

The optical receiver 820 receives the downstream wavelength division multiplexing optical signal including optical network unit control information from the optical line terminal 100 and converts the received downstream wavelength division multiplexing optical signal into an electrical signal.

The signal processing module 840 transmits the downstream wavelength division multiplexing optical signal converted into the electrical signal to a switch 850 of an upper layer and receives the optical network unit control information on the optical transmitter 810 from the switch 850 of the upper layer to control the optical transmitter 810.

The switch 850 generates the optical network unit control information from a data packet of the downstream wavelength division multiplexing optical signal transmitted from the signal processing module 840 and transmits the generated optical network unit control information to the signal processing module 840.

Meanwhile, the optical line terminal 100 generates and transmits the downstream wavelength division multiplexing optical signal coupled with a second low frequency monitoring signal for monitoring a downstream optical signal, detects the first and second low frequency monitoring signals by the optical power branch and the wavelength demultiplexing of the upstream and downstream wavelength division multiplexing optical signals received from the optical network unit 800, and controls the downstream wavelength division multiplexing optical signal based on the detected second low frequency signal. The optical line terminal 100 generates the optical network unit control information from the detected first low frequency monitoring signal so as to control the optical network unit 800 and transmits the generated optical network unit control information to the optical network unit 800.

Describing in detail, the optical transmitting unit 110 generates the downstream wavelength division multiplexing optical signal coupled with the second low frequency monitoring signal for monitoring the downstream optical signal and wavelength-multiplexes the generated downstream wavelength division multiplexing optical signal. For example, the optical transmitting unit 110 may add a low frequency modulation signal of about 2 kHz to the data signal. Here, the low frequency generator 112 generates the second low frequency monitoring signal for monitoring the downstream optical signal. The laser diode (LD) 111 generates the downstream wavelength division multiplexing optical signal coupled with the second low frequency monitoring signal for monitoring the downstream optical signal. The standard wavelength multiplexer 120 wavelength-mulitplexes the generated downstream wavelength division multiplexing optical signal.

The optical receiving unit 130 wavelength-demultiplexes and receives the upstream wavelength division multiplexing optical signal transmitted from the wavelength-band dividing and coupling unit 150. Here, the standard wavelength demultiplexer 140 wavelength-demultiplexes the upstream wavelength division multiplexing optical signal transferred from the wavelength-band dividing and coupling unit 150 and the optical receiver 131 receives the wavelength-demultiplexed upstream wavelength division multiplexing optical signal.

The wavelength-band dividing and coupling unit 150 transmits the previously wavelength-multiplexed downstream wavelength division multiplexing optical signal through an optical line and transmits the upstream wavelength division multiplexing optical signal received from the optical network unit 800.

The monitoring tap coupler 160 branches a part of optical power of the upstream and downstream wavelength division multiplexing optical signals.

The monitoring signal processing unit 170 transmits the branched upstream and downstream wavelength division multiplexing optical signals to the photodetectors connected with each channel through the monitoring circular wavelength demultiplexing to be converted into the electrical monitoring signals and passes the converted monitoring signals through the first and second low frequency band filters to detect the first and second low frequency monitoring signals.

Describing in detail the monitoring signal processing unit 170, the monitoring circular wavelength demultiplexer 171 divides the upstream and downstream wavelength division multiplexing optical signals branched by the monitoring tap coupler 160 for each wavelength and transmits the divided upstream and downstream wavelength division multiplexing optical signals to the photodetectors connected with each channel.

The monitoring photodetector (mPD) 181 converts the upstream and downstream wavelength division multiplexing optical signals divided by the monitoring circular wavelength demultiplexer 171 into the electrical monitoring signals.

The electrical signal distributor 182 distributes the monitoring signal converted by the monitoring photodetector (mPD) 181.

The low frequency electrical filter 183 passes the monitoring signal distributed by the electrical signal distributor 182 through each of the first and second low frequency band filters to detect the first and second low frequency monitoring signals.

Meanwhile, the signal processing module 190 controls the downstream wavelength division multiplexing optical signal based on the detected second low frequency signal and generates the optical network unit control information from the first low frequency monitoring signal detected by the monitoring signal processing unit 170.

The switch 200 transmits the optical network unit control information transmitted from the signal processing module 190 to the optical transmitting unit 110 through the signal processing module 190 so as to control the optical network unit 800.

Figure 2A:
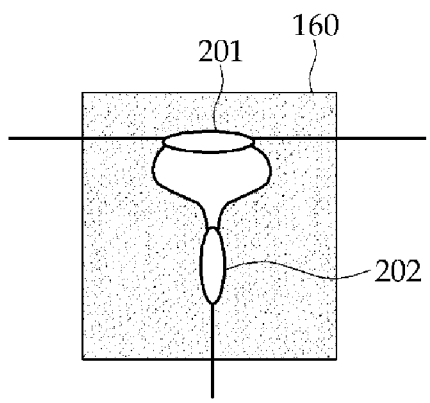
FIGS. 2A and 2B are first and second configuration diagrams of a monitoring tap coupler according to the exemplary embodiment of the present disclosure in FIG. 1.
Figure 2B:
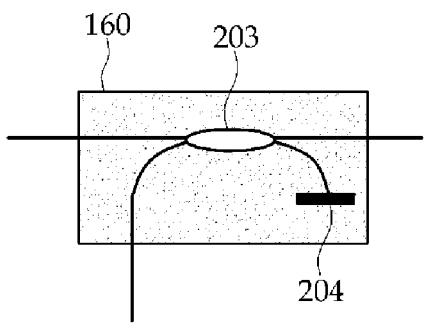

FIGS. 2A and 2B are first and second configuration diagrams of a monitoring tap coupler according to the exemplary embodiment of the present disclosure in FIG. 1.

As illustrated in FIG. 2A, the monitoring tap coupler 160 includes a 2×2 optical power branching tap coupler 201 and an optical power branching tap coupler 202.

The 2×2 optical power branching tap coupler 201 takes a form of 2×2 port and has an optical power branch ratio of about 90:10 or 95:5 and branches a part of the optical power of the upstream signal and the downstream signal.

The optical power branching tap coupler 202 takes a form of 1×2 port and has a branch ratio of about 80:20 or 90:10 and transmits a combination of the detected upstream and downstream signals to a single output port.

As illustrated in FIG. 2B, the monitoring tap coupler 160 includes a 2×2 optical power branching tap coupler 203 and a reflective tap coupler 204.

The 2×2 optical power branching tap coupler 203 has the same optical power branch ratio as the 2×2 optical power branching tap coupler 201 illustrated in FIG. 2A.

However, the reflective tap coupler 204 is attached to the 2×2 optical power branching tap coupler 203. The reflective tap coupler 204 reflects more than 90% reflectivity to the downstream optical signal branch port, unlike the optical power branching tap coupler 202. By doing so, the reflective tap coupler 204 transmits the branched downstream optical signal to the same port into which the upstream optical signal is branched.

Figure 3:
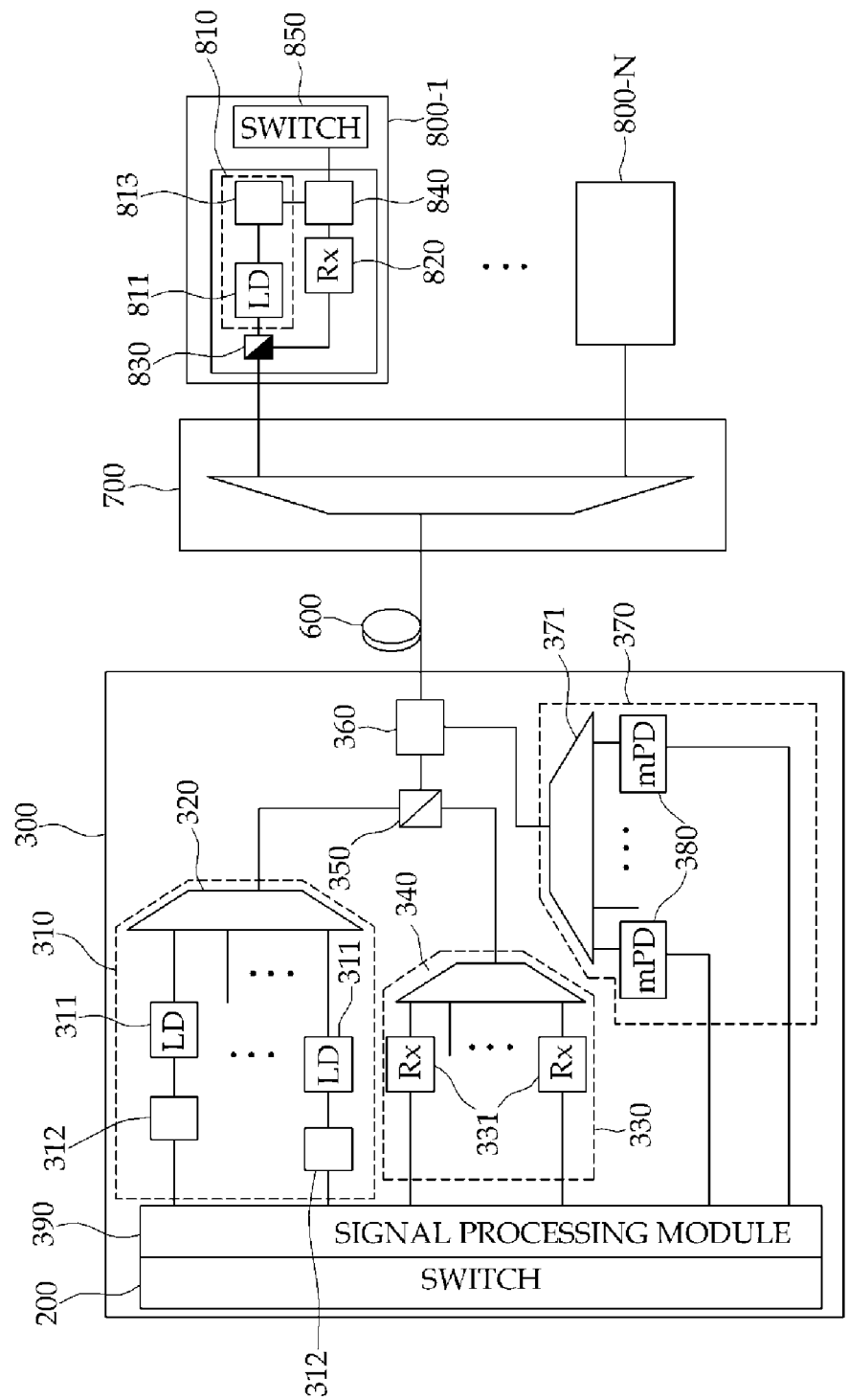
FIG. 3 is a configuration diagram of a system for monitoring and controlling upstream and downstream optical signals in a bidirectional wavelength division multiplexing optical network according to a second exemplary embodiment of the present disclosure.

FIG. 3 is a configuration diagram of a system for monitoring and controlling upstream and downstream optical signals in a bidirectional wavelength division multiplexing optical network according to a second exemplary embodiment of the present disclosure.

As illustrated in FIG. 3, a system for monitoring and controlling upstream and downstream wavelength division multiplexing optical signals includes an optical line terminal (OLT) 300 and optical network units (ONU) 800-1, ..., 800-N (hereinafter, referred to as 800). Meanwhile, the optical line terminal 300 includes an optical transmitting unit 310, an optical receiving unit 330, a wavelength-band dividing and coupling unit 350, a monitoring tap coupler 360, a monitoring signal processing unit 370, a signal processing module 390, and a switch 200. The optical transmitting unit 310 includes a laser diode (LD) 311, a laser diode driver 312, and a standard wavelength multiplexer 320. The optical receiving unit 330 includes an optical receiver 331 and a standard wavelength demultiplexer 340. The monitoring signal processing unit 370 includes a monitoring extended wavelength demultiplexer 371 and a monitoring photodetector (mPD) 381.

Referring to FIG. 3, the optical line terminal 300 according to the second exemplary embodiment of the present disclosure has components which are substantially similar to the components of the optical line terminal 100 of FIG. 1, but includes the monitoring extended wavelength demultiplexer 371, instead of the monitoring circular wavelength demultiplexer 171 of the optical line terminal 100 of FIG. 1 in the monitoring signal processing unit 370. The electrical signal distributor 182 and the low frequency electrical filter 183 included in the optical line terminal 100 of FIG. 1 are not included in the optical line terminal 300. Therefore, the monitoring signal processing unit 370 is mainly described, but the repeated description of other components other than the monitoring signal processing unit 370 will be omitted.

The circular wavelength demultiplexer 171 included in the optical line terminal 100 of FIG. 1 transmits the upstream and downstream wavelength division multiplexing optical signals to the same output port, such that the number of output ports is N. On the other hand, the monitoring extended wavelength demultiplexer 371 included in the optical line terminal 300 of FIG. 3 transmits the upstream and downstream wavelength division multiplexing optical signals to different output ports, such that the number of output ports are increased to 2N. Therefore, as the monitoring photodetector (mPD) 381 connected with the output port is increases twice, an area occupied by the monitoring signal processing unit 370 is increased.

However, the optical line terminal 300 does not include the low frequency generator 112, the electrical signal distributor 182, and the low frequency electrical filter 183 that are included for monitoring the upstream and downstream wavelength division multiplexing optical signals in the optical line terminal 100 of FIG. 1, and therefore the configuration of the monitoring signal processing unit 370 may be simplified. The monitoring signal processing unit 370 spatially divides the upstream and downstream wavelength division multiplexing signals in controlling and monitoring the optical signals, thereby minimizing the mutual interference and implementing the high-quality optical line terminal 300.

The optical transmitting unit 310 generates the downstream wavelength division multiplexing optical signal and wavelength-multiplexes the generated downstream wavelength division multiplexing optical signal. The optical transmitting unit 310 includes a laser diode (LD) 311, a laser diode driver 312, and a standard wavelength multiplexer 320.

The optical receiving unit 330 wavelength-demultiplexes and receives the upstream wavelength division multiplexing optical signal transmitted from the wavelength-band dividing and coupling unit 350.

The wavelength-band dividing and coupling unit 350 transmits the previously wavelength-multiplexed downstream wavelength division multiplexing optical signal through an optical line and transmits the upstream wavelength division multiplexing optical signal received from the optical network unit 800.

The monitoring tap coupler 360 branches a part of optical power of the upstream and downstream wavelength division multiplexing optical signals.

The monitoring signal processing unit 370 transmits the branched upstream and downstream wavelength division multiplexing optical signals to the photodetectors connected with different channels by the monitoring extended wavelength demultiplexing to be converted into electrical first and second low frequency monitoring signals.

The signal processing module 390 controls the downstream wavelength division multiplexing optical signal based on the converted second low frequency signal and generates the optical network unit control information from the first low frequency monitoring signal detected by the monitoring signal processing unit 370.

The switch 200 transmits the optical network unit control information transmitted from the signal processing module 390 to the optical transmitting unit 310 through the signal processing module 390 so as to control the optical network unit 800.

Figure 4:
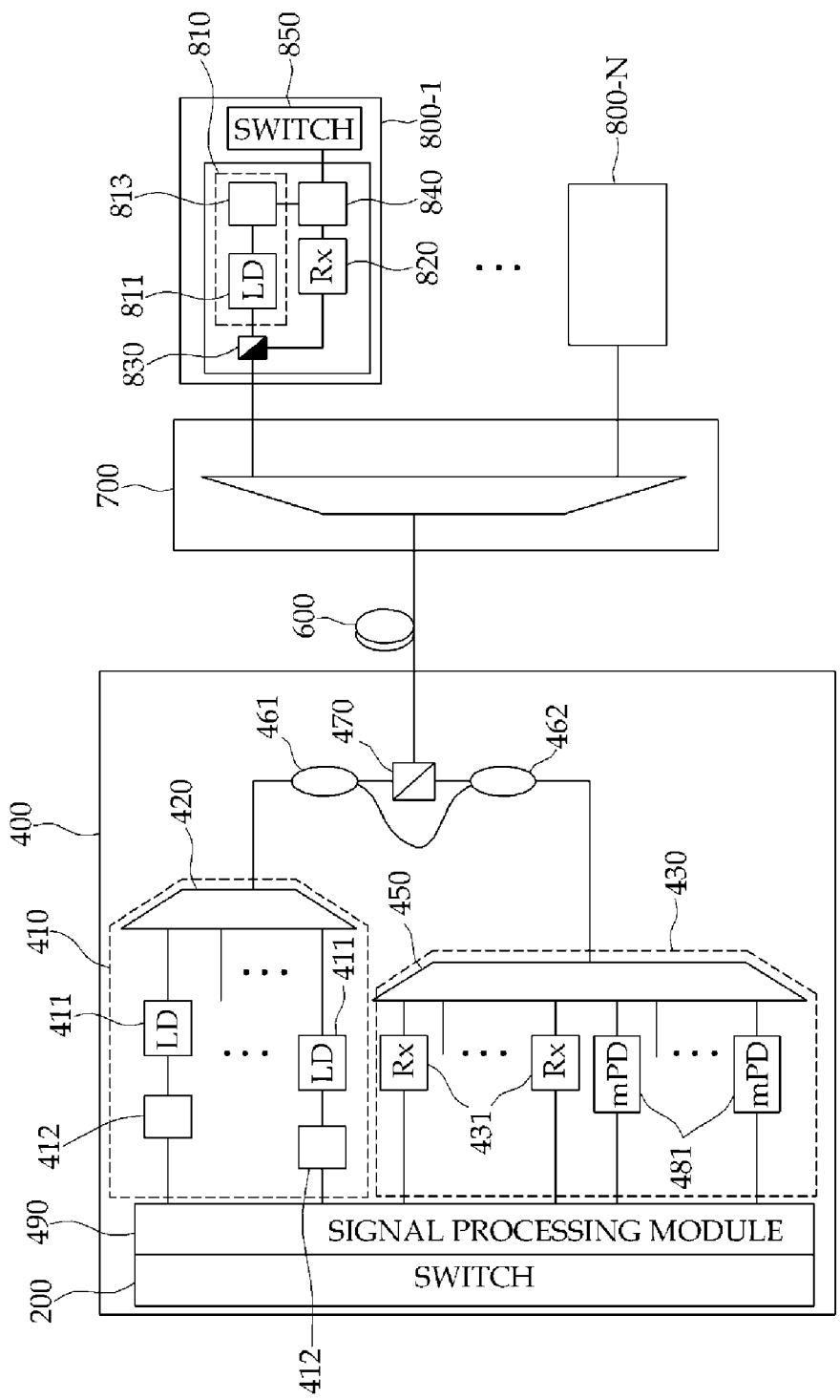
FIG. 4 is a configuration diagram of a system for monitoring and controlling upstream and downstream optical signals in a bidirectional wavelength division multiplexing optical network according to a third exemplary embodiment of the present disclosure.

FIG. 4 is a configuration diagram of a system for monitoring and controlling upstream and downstream optical signals in a bidirectional wavelength division multiplexing optical network according to a third exemplary embodiment of the present disclosure.

As illustrated in FIG. 4, a system for monitoring and controlling upstream and downstream wavelength division multiplexing optical signals includes an optical line terminal (OLT) 400 and optical network units (ONU) 800-1, . . . , 800-N (hereinafter, referred to as 800). In this configuration, the optical line terminal 400 includes an optical transmitting unit 410, an optical receiving unit 430, a monitoring branch tap coupler 462, a monitoring coupling tap coupler 462, a wavelength-band dividing and coupling unit 470, a signal processing module 490, and a switch 200. The optical transmitting unit 410 includes a laser diode (LD) 411, a laser diode driver 412, and a standard wavelength multiplexer 420. The optical receiving unit 430 includes an extended wavelength demultiplexer 450, a signal strength sensing optical receiver 431, and a monitoring photodetector 481.

Referring to FIG. 4, the optical line terminal 400 according to the third exemplary embodiment of the present disclosure has components which are substantially similar to the components of the optical line terminal 300 of FIG. 2 but does not include the monitoring tap coupler 360. The optical line terminal 400 includes a monitoring branch tap coupler 461 and a monitoring coupling tap coupler 462 that branch and couple the downstream wavelength division multiplexing optical signal into the optical transmitting unit 410 and the optical receiving unit 430 of the wavelength division multiplexing optical signals as illustrated in FIG. 4. The optical receiving unit 430 does not include a general optical receiver and instead uses a received signal strength indication (RSSI) optical receiver 431 to sense the upstream wavelength division multiplexing optical signal strength. The configuration may maintain advantages of simplification of the configuration of the monitoring signal processing unit 370, the minimization of the mutual interference between the upstream and downstream wavelength division multiplexing optical signals, and the like, while reducing the increase in the area of the monitoring signal processing unit 370 of FIG. 3. Therefore, the optical receiving unit 430 is mainly described, but the repeated description of other components other than the optical receiving unit 430 will be omitted.

The optical transmitting unit 410 generates the downstream wavelength division multiplexing optical signal and wavelength-multiplexes the generated downstream wavelength division multiplexing optical signal. The optical transmitting unit 410 includes a laser diode (LD) 411, a laser diode driver 412, and a standard wavelength multiplexer 420.

The wavelength-band dividing and coupling unit 450 transmits the previously wavelength-multiplexed downstream wavelength division multiplexing optical signal through an optical line and transmits the upstream wavelength division multiplexing optical signal received from the optical network unit 800.

The monitoring branch tap coupler 461 branches a part of the optical power of the downstream wavelength division multiplexing optical signal.

The monitoring coupling tap coupler 462 couples the branched downstream wavelength division multiplexing optical signal with the transmitted upstream wavelength division multiplexing optical signal.

The optical receiving unit 430 performs demultiplexing on the upstream and downstream wavelength division multiplexing optical signals at different channels to transmit the upstream and downstream wavelength division multiplexing optical signals differently, convert the transmitted upstream wavelength division multiplexing optical signal into an electrical first low frequency monitoring signal, and convert the transmitted downstream wavelength division multiplexing optical signal into an electrical second low frequency monitoring signal.

Describing in detail the optical receiving unit 430, the extended wavelength demultiplexer 450 performs demultiplexing on the upstream and downstream wavelength division multiplexing optical signals at different channels to transmit the upstream and downstream wavelength division multiplexing optical signals differently.

The received signal strength indication optical receiver 431 converts the upstream wavelength division multiplexing optical signal transmitted from the extended wavelength demultiplexer 450 into the electrical first low frequency monitoring signal.

The monitoring photodetector 481 converts the downstream wavelength division multiplexing optical signal transmitted from the extended wavelength demultiplexer 450 into the electrical second low frequency monitoring signal.

Meanwhile, the signal processing module 490 controls the downstream wavelength division multiplexing optical signal based on the converted second low frequency signal and generates the optical network unit control information from the first low frequency monitoring signal detected by the monitoring signal processing unit 470.

The switch 200 transmits the optical network unit control information transmitted from the signal processing module 490 to the optical transmitting unit 410 through the signal processing module 490 so as to control the optical network unit 800.

The functional operations and implementations described in the specification of the present disclosure may be implemented by digital electronic circuits, computer software, firmware, or hardware, or at least one combination thereof. The implementations described in the specification of the present disclosure may be implemented as at least one module relating to encoded computer program commands on a program storage medium of a type for controlling an operation of at least one computer program product, that is, a data processing apparatus or for being executed thereby.

The drawings of the present disclosure illustrates operation processes, which are not to be construed as performing the operations in a specific order illustrated to obtain preferred results or performing all the illustrated operations. In the specific case, multitasking and parallel processing may be advantageous.

The specification of the present disclosure describes specific exemplary embodiments. The exemplary embodiments belong to the following Claims. For example, the operations described in claims may still achieve preferred results while being performed in different orders.

The description of the present disclosure has been just exemplified. It will be appreciated by those skilled in the art that various modifications and alterations can be made without departing from the essential spirit of the present disclosure. Accordingly, the embodiments disclosed in the present specification are used not to limit the present disclosure. The scope of the present disclosure is to be construed by the appended claims and it is to be construed that all spirits within a scope equivalent thereto are included in the appended claims of the present disclosure.

According to the present embodiments, it is possible to unite, monitor, and control the optical outputs and wavelengths of the upstream and downstream wavelength division multiplexing optical signals into the single system, by adding different low frequency monitoring signals to the upstream and downstream wavelength division multiplexing optical signals in the bidirectional wavelength division multiplexing optical network and allowing the optical line terminal to sense and detect the low frequency components of the upstream and downstream optical signals. In this aspect, the present disclosure passes the existing technology limit, and therefore is the invention that can use the relevant technology and has the sufficient possibility of the market or business of the applied apparatus and industrial applicability to be able to be apparently practiced in reality.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. An optical line terminal for monitoring and controlling upstream and downstream optical signals, comprising:
    an optical transmitting unit configured to generate and wavelength-multiplex a downstream wavelength division multiplexing optical signal coupled with a second low frequency monitoring signal for monitoring a downstream optical signal;
    a wavelength-band dividing and coupling unit configured to transmit the wavelength-multiplexed downstream wavelength division multiplexing optical signal through an optical line and transmit an upstream wavelength division multiplexing optical signal received from an optical network unit;
    an optical receiving unit configured to wavelength-demultiplex and receive the upstream wavelength division multiplexing optical signal transmitted from the wavelength-band dividing and coupling unit;
    a monitoring tap coupler configured to branch a part of optical power of the upstream and downstream wavelength division multiplexing optical signals;
    a monitoring signal processing unit configured to transmit the branched upstream and downstream wavelength division multiplexing optical signals to photodetectors connected with each channel by monitoring circular wavelength demultiplexing so as to be converted into electrical monitoring signals and pass the converted monitoring signals through first and second low frequency band filters to detect first and second low frequency monitoring signals;
    a signal processing module configured to control the downstream wavelength division multiplexing optical signal based on the detected second low frequency signal and generate optical network unit control information from the extracted first low frequency monitoring signal; and
    a switch configured to transmit the extracted optical network unit control information to the optical transmitting unit through the signal processing module so as to control the optical network unit.

2. The optical line terminal of claim 1, wherein the monitoring tap coupler includes:
    a 2×2 optical power branching tap coupler configured to branch a part of optical power of the upstream wavelength division multiplexing optical signal and a part of optical power of the downstream wavelength division multiplexing optical signal; and
    a 1×2 optical power branching tap coupler configured to couple the branched upstream wavelength division multiplexing optical signal and downstream wavelength division multiplexing optical signal and transmit the coupled upstream wavelength division multiplexing optical signal and downstream wavelength division multiplexing optical signal to the signal processing module through a single port.

3. The optical line terminal of claim 1, wherein the monitoring tap coupler includes:
    a 2×2 optical power branching tap coupler configured to branch a part of optical power of the upstream wavelength division multiplexing optical signal and a part of optical power of the downstream wavelength division multiplexing optical signal; and
    a reflector attached to the 2×2 optical power branching tap coupler to reflect the branched downstream wavelength division multiplexing optical signal, couple the reflected downstream wavelength division multiplexing optical signal with the branched upstream wavelength division multiplexing optical signal and transmit the coupled optical signals to the signal processing module through a single port.

4. The optical line terminal of claim 1, wherein the monitoring signal processing unit includes:
    a monitoring circular wavelength demultiplexer configured to divide the branched upstream and downstream wavelength division multiplexing optical signals for each wavelength and transmit the divided upstream and downstream wavelength division multiplexing optical signals to the photodetectors connected with each channel;

a monitoring phototector configured to convert the upstream and downstream wavelength division multiplexing optical signals divided by the monitoring circular wavelength demultiplexer into electrical monitoring signals;

an electrical signal distributor configured to distribute the converted monitoring signal; and a low frequency electrical filter configured to pass the distributed monitoring signals through first and second low frequency band filters, respectively, to detect the first and second low frequency monitoring signals.

5. An optical line terminal for monitoring and controlling upstream and downstream optical signals, comprising:

an optical transmitting unit configured to generate and wavelength-multiplex a downstream wavelength division multiplexing optical signal coupled with a second low frequency monitoring signal for monitoring a downstream optical signal;

a wavelength-band dividing and coupling unit configured to transmit the wavelength-multiplexed downstream wavelength division multiplexing optical signal through an optical line and transmit an upstream wavelength division multiplexing optical signal received from an optical network unit;

an optical receiving unit configured to wavelength-demultiplex and receive the upstream wavelength division multiplexing optical signal transmitted from the wavelength-band dividing and coupling unit;

a monitoring tap coupler configured to branch a part of optical power of the upstream and downstream wavelength division multiplexing optical signals;

a monitoring signal processing unit configured to transmit the branched upstream and downstream wavelength division multiplexing optical signals to photodetectors connected with different channels by monitoring extended wavelength demultiplexing to be converted into electrical first and second low frequency monitoring signals;

a signal processing module configured to control the downstream wavelength division multiplexing optical signal based on the converted second low frequency signal and generate optical network unit control information from the extracted first low frequency monitoring signal; and a switch configured to transmit the extracted optical network unit control information to the optical transmitting unit through the signal processing module so as to control the optical network unit.

6. The optical line terminal of claim 5, wherein the monitoring signal processing unit includes:

a monitoring extended wavelength demultiplexer configured to transmit the branched upstream and downstream wavelength division multiplexing optical signals to the photodetectors connected with different channels by the monitoring extended wavelength demultiplexing; and a monitoring phototector configured to convert the upstream and downstream wavelength division multiplexing optical signals transmitted from the monitoring extended wavelength demultiplexer into electrical first and second low frequency monitoring signals.

7. An optical line terminal for monitoring and controlling upstream and downstream optical signals, comprising:

an optical transmitting unit configured to generate and wavelength-multiplex a downstream wavelength division multiplexing optical signal coupled with a second low frequency monitoring signal for monitoring a downstream optical signal;

a wavelength-band dividing and coupling unit configured to transmit the wavelength-multiplexed downstream wavelength division multiplexing optical signal through an optical line and transmit an upstream wavelength division multiplexing optical signal received from an optical network unit;

a monitoring branch tap coupler configured to branch a part of optical power of the downstream wavelength division multiplexing optical signal;

a monitoring coupling tap coupler configured to couple the branched downstream wavelength division multiplexing optical signal and the transmitted upstream wavelength division multiplexing optical signal;

an optical receiving unit configured to perform demultiplexing on the upstream and downstream wavelength division multiplexing optical signals at different channels to transmit the upstream and downstream wavelength division multiplexing optical signals differently, convert the transmitted upstream wavelength division multiplexing optical signal into an electrical first low frequency monitoring signal, and convert the transmitted downstream wavelength division multiplexing optical signal into an electrical second low frequency monitoring signal;

a signal processing module configured to control the downstream wavelength division multiplexing optical signal based on the converted second low frequency signal and generate optical network unit control information from the extracted first low frequency monitoring signal; and a switch configured to transmit the extracted optical network unit control information to the optical transmitting unit through the signal processing module so as to control the optical network unit.

8. The optical line terminal of claim 7, wherein the optical receiving unit includes:

an extended wavelength demultiplexer configured to perform demultiplexing on the upstream and downstream wavelength division multiplexing optical signals at different channels to transmit the upstream and downstream wavelength division multiplexing optical signals differently;

a received signal strength indication optical receiver configured to convert the upstream wavelength division multiplexing optical signal transmitted from the extended wavelength demultiplexer into an electrical first low frequency monitoring signal; and a monitoring photodector configured to convert the downstream wavelength division multiplexing optical signal transmitted from the extended wavelength demultiplexer into an electrical second low frequency monitoring signal.

* * * * *